United States Patent [19]

Reibl

[11] Patent Number: 4,557,571
[45] Date of Patent: Dec. 10, 1985

[54] COMPACT CAMERA WITH FLASH UNIT

[75] Inventor: Michael Reibl, Sindelfingen, Fed. Rep. of Germany

[73] Assignee: Eastman Kodak Company, Rochester, N.Y.

[21] Appl. No.: 650,134

[22] Filed: Sep. 13, 1984

[30] Foreign Application Priority Data

Dec. 16, 1983 [DE] Fed. Rep. of Germany ... 8336141[U]

[51] Int. Cl.$^4$ .............................................. G03B 15/03
[52] U.S. Cl. ................................................ 354/149.11
[58] Field of Search ................. 354/145.1, 149.11, 187

[56] References Cited

U.S. PATENT DOCUMENTS

| | | | |
|---|---|---|---|
| 3,504,605 | 4/1970 | Scudder | 95/11 |
| 4,181,415 | 1/1980 | Uchiyama et al. | 354/86 |
| 4,319,818 | 3/1982 | Sawara | 354/145 |
| 4,350,420 | 9/1982 | Engelsmann et al. | 354/145 |
| 4,389,110 | 6/1983 | Pizzuti | 354/187 X |

Primary Examiner—John Gonzales
Attorney, Agent, or Firm—Roger A. Fields

[57] ABSTRACT

A photographic camera includes a built-in electronic flash unit which is pivotable with respect to the camera housing. The flash unit pivots between an inactive folded position in which it forms an integrated part of the camera housing to cover a taking lens, and an operative erect position in which it is sufficiently removed from the lens to permit picture-taking substantially without any red-eye effect. The lens is movable along its optical axis to a taking position extended from the camera housing and to a storage position retracted in the housing, in response to pivoting the flash unit to its operative and folded positions, respectively. With the flash unit in its folded position and the lens in its storage position, the camera is relatively compact.

3 Claims, 3 Drawing Figures

4,557,571

COMPACT CAMERA WITH FLASH UNIT

BACKGROUND OF THE INVENTION

1. Field of the Invention

The invention relates generally to photographic cameras, and more particularly to a compact camera with a built-in flash unit.

2. Description of the Prior Art

A current trend in camera design is to incorporate an electronic flash unit in the camera housing and yet make such housing relatively small in size in order to increase its ease of storage, portability, and handling. Examples of smaller size cameras with built-in electronic flash units are the recently introduced disk film cameras, such as sold by Eastman Kodak Company, and the recently introduced compact 35 mm cameras, such as sold by Nikon, Inc. As a consequence of making a camera smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such phenomenon is attributable to the incidence, into the taking lens, of the red light reflected from the retinas in the person's eyes illuminated by the flash light.

Red-eye may be substantially avoided by increasing the separation between the flash unit and the taking lens. As a result, light from the flash unit will reach the eyes of a person being photographed at too great an angle to be reflected by his retinas into the taking lens.

In U.S. Pat. No. 4,319,818, granted Mar. 16, 1982, red-eye appears to be substantially avoided without increasing the size of a compact 35 mm camera to any great degree, by providing a built-in electronic flash unit that is pivotable with respect to the camera housing. The flash unit is pivotable between an inactive folded position in which it forms an integrated part of the camera housing in front of the camera lens, and an operative erect position in which it is sufficiently removed from the lens to permit picture-taking substantially without the occurence of red-eye. However, because the lens mount is fixed in an extended position with respect to the camera housing to provide the necessary extension for the short focus lenses in the compact camera, some degree of compactness is sacrificed.

SUMMARY OF THE INVENTION

As compared to the prior art examples described above, the invention advantageously provides a camera including a built-in flash unit with improved compactness.

The invention is embodied in a compact camera having a built-in flash unit which is pivotable with respect to the camera housing. As in U.S. Pat. No. 4,319,818, the flash unit is movable between an inactive folded position in which it forms an integrated part of the camera housing to cover the taking lens, and an operative erect position in which it is sufficiently removed from the lens to permit picture-taking substantially without any red-eye effect. However, in contrast to the prior art examples, the lens is moved along its optical axis to a taking position extended from the camera housing and to a storage position retracted in the housing, in response to pivoting the flash unit to its operative and folded positions, respectively. Thus, with the lens in its storage position and the flash unit in its folded position, the camera housing is more compact than in the prior art examples, thereby improving its ease of storage, handling, and portability.

BRIEF DESCRIPTION OF THE DRAWINGS

The invention will be described in connection with the drawings, wherein.

DESCRIPTION OF THE PREFERRED EMBODIMENT OF THE INVENTION

The invention is described as being embodied in a compact 35 mm camera with a built-in electronic flash unit. Because such photographic cameras have recently become well known, this description is directed in particular to camera elements forming part of or cooperating directly with the preferred embodiment. It is to be understood, however, that camera elements not specifically shown or described may take various forms known to persons of ordinary skill in the art.

Figure 1:
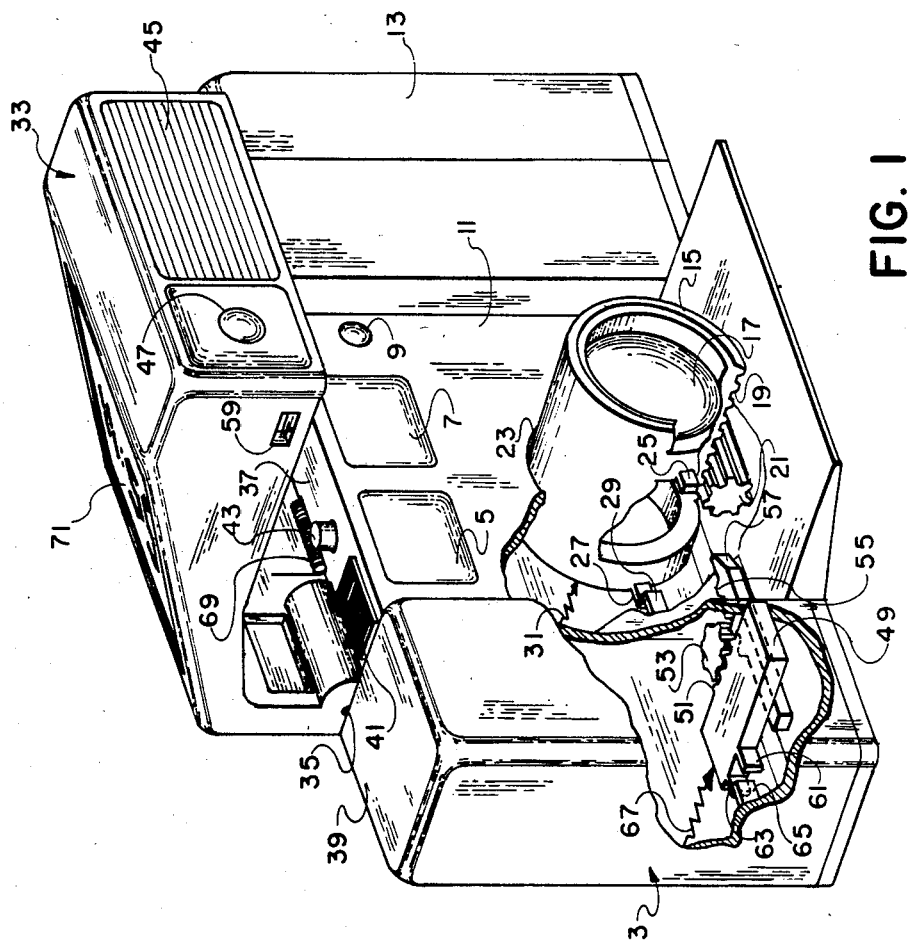
FIG. 1 is a front perspective view of a compact camera with a built-in flash unit according to a preferred embodiment of the invention, illustrating the flash unit in an operative erect position and a taking lens in an extended picture-taking position.
Figure 3:
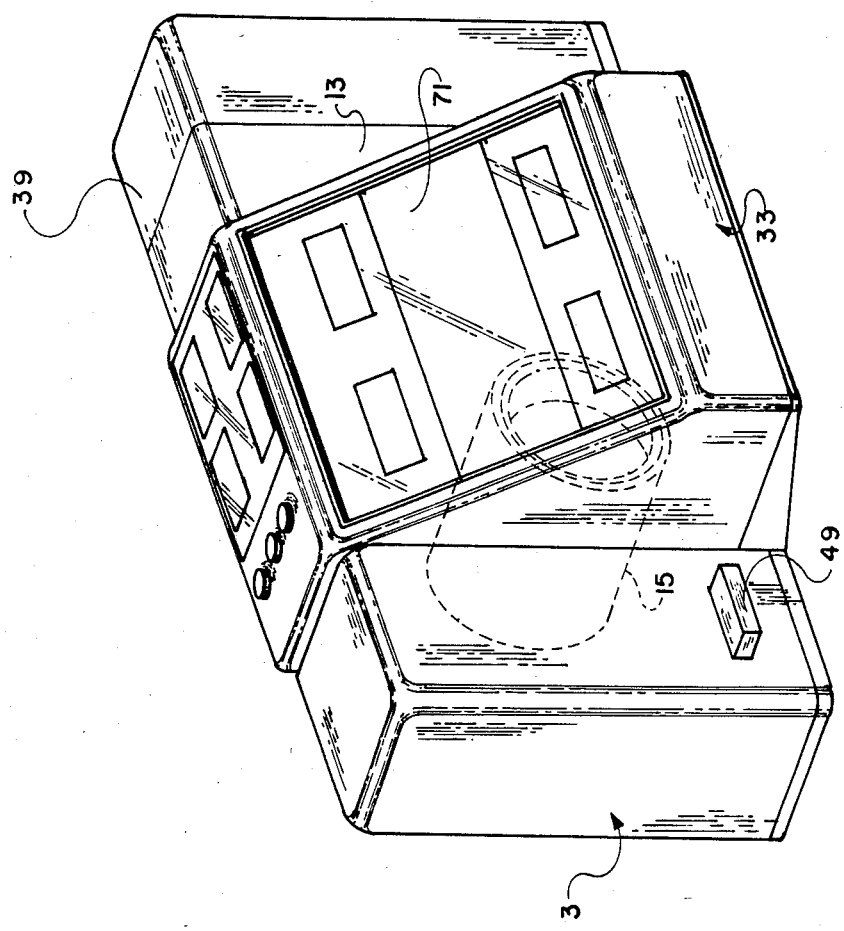
FIG. 3 is a front perspective view of the compact camera, illustrating the flash unit in an inactive folded position and the lens in a retracted storage position.

Referring now to the drawings, FIG. 1 shows a compact 35 mm camera having a housing 3. An autofocusing window 5, a viewfinder window 7, and an ambient light-measuring photocell 9 for exposure control are located on a recessed portion 11 of a front face 13 of the housing 3. A retractable lens mount 15 containing a taking lens assemblage 17 is supported by suitable means, such as an elongate rack 19 fixed to the lens mount and an associated pinion 21 rotatably connected to the housing 3, to enable movement of the lens mount along the optical axis of the lens assemblage through a light-trapping opening 23 in the recessed portion 11 of the front face 13. As shown in FIGS. 1 and 3, respectively, the lens mount 15 is movable through the opening 23 between a picture-taking position, in which the lens mount is extended from the housing 3 to a location somewhat beyond the front face 13, and a storage or inoperative position, in which the lens mount is retracted in the housing at least to within the recessed portion 11 of the front face. A pair of spaced projections 25 and 27 on the lens mount 15 cooperate with a stop 29 on the housing 3 to limit movement of the lens mount between its taking and storage positions, and a schematically shown spring 31 urges the lens mount to its taking position.

Thus, by making the lens mount 15 retractable, it may be pushed back into the camera housing 3 when the lens assemblage 17 is not in use, to provide a relatively compact arrangement. Moreover, there is formed a convenient way of providing the necessary extension for the short focus lenses commonly used in small size cameras.

An electronic flash unit 33 is pivotably connected to the camera housing 3 by means of a rod 35 disposed along a recessed portion 37 of a top face 39 of the housing. As shown in FIGS. 1 and 3, respectively, the flash unit is pivotable between an operative erect position and an inactive folded position. In the inactive folded position, the flash unit 33 fits snugly within the recessed portion 37 of the top face 39 and the recessed portion 11 of the front face 13, and thereby forms an integrated part of the housing 3. In addition, the flash unit 33 covers a shutter release button 41 on the recessed portion 37, depresses a normally raised switch extension 43 on such recessed portion to open a flash charging circuit, not shown, and covers the front of the lens mount 15 as well as the autofocussing window 5, the viewfinder window 7, and the photocell 9 on the recessed portion 11. In the operative erect position, the flash unit 33 is sufficiently removed from the front of the lens mount 15 to permit picture-taking substantially without any red-eye effect and is disposed with a flash window 45 and an ambient light-measuring photocell 47 for flash control facing the subject to be photographed. In addition, the flash unit 33 is spaced from the shutter release button 41 to permit its operation and is removed from the switch extension 43, which is raised to close the flash charging circuit.

When the flash unit 33 is pivoted to its inactive folded position, it pushes the lens mount 15 inwardly of the camera housing 3 to its storage position, as shown in FIG. 3. Thus, with the lens mount 15 in its storage position and the flash unit 33 in its inactive folded position, a relatively compact camera is provided. On the other hand, movement of the flash unit 33 to its operative erect position, permits the spring 31 to urge the lens mount 15 outwardly of the housing 3 to its taking position, as shown in FIG. 1.

A locking device serves to secure the flash unit 33 in its inactive folded position to retain the lens mount 15 in its storage position, against the urging of the spring 31. As shown in FIG. 1, the locking device includes an unlocking button 49 located on the front face 13 of the camera housing 3. The unlocking button 49 has an elongate toothed section 51 in mesh with a pinion 53, which engages a locking rack 55. The rack 55 has a reduced-width end portion 57 that is received in a cavity 59 in the flash unit 33 to secure the flash unit in its inactive folded position. A pair of stops 61 and 63 on the unlocking button 49 cooperate with a stop 65 on the camera housing 3 to limit movement of the button. When the locking button is depressed, against the urging of a return spring 67, the pinion 53 is rotated to withdraw the end portion 57 of the locking rack 55 from the cavity 59. This frees the flash unit 33 for movement by a schematically shown spring 69 from its inactive folded position to its operative erect position, thereby permitting the lens mount 15 to be moved by the spring 31 from its storage position to its taking position.

Figure 2:
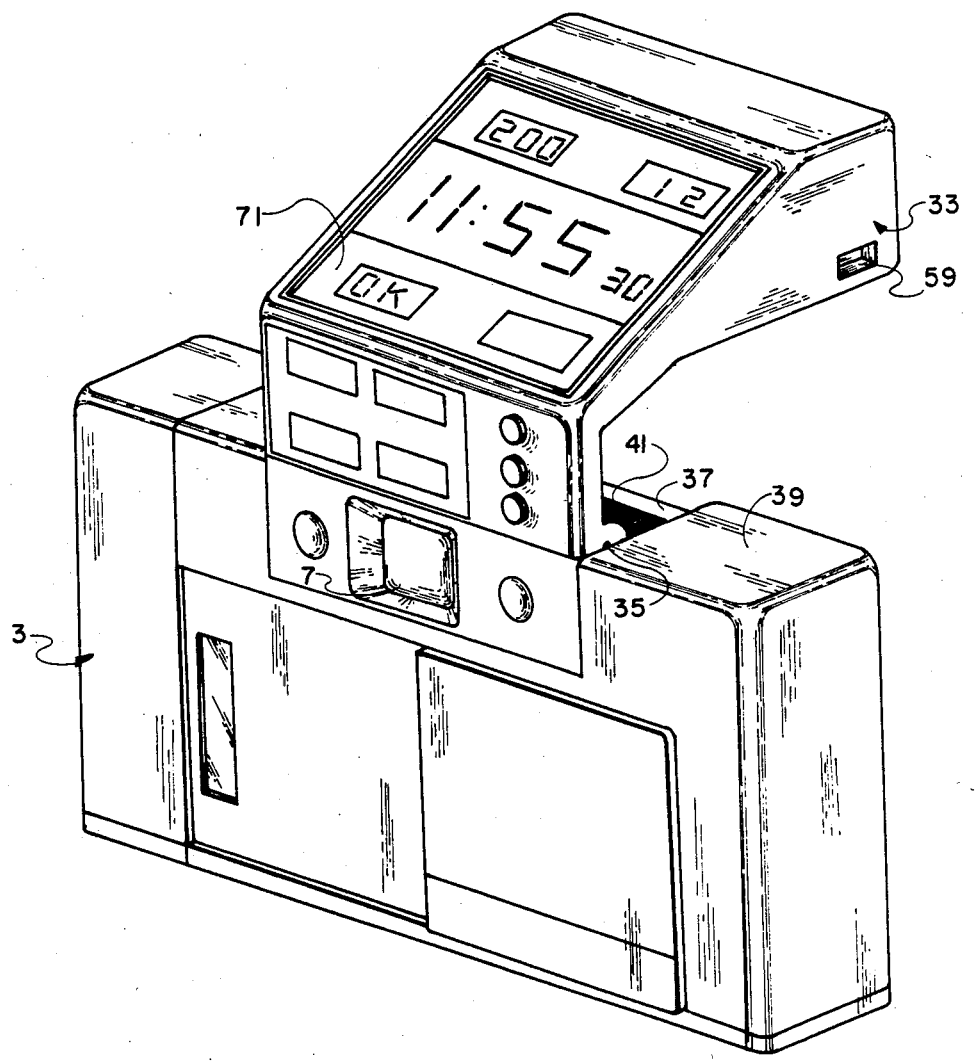
FIG. 2 is a rear perspective view of the compact camera as depicted in FIG. 1.

When the flash unit 33 is in its operative erect position, a display panel 71 on the flash unit is disposed to face the camera user, as shown in FIGS. 1 and 2. The display panel 71, which may include a liquid crystal display as well as a number of light-emitting diodes, for example, is energized along with the flash charging circuit in response to the raising of the switch extension 43 on the recessed portion 37 of the top face 39 of the camera housing 3. A variety of information may be shown on the display panel 71, such as the time and date, a flash readiness indication, the film speed, the number of pictures remaining to be taken, etc.

While the invention has been described with reference to a preferred embodiment, it will be understood that various modifications can be effected within the ordinary skill in the art without departing from the scope of the invention. For example, a bi-directional drive linkage may be provided which couples the lens mount 15 and the flash unit 33 to move the lens mount to its storage and taking positions as the flash unit is pivoted to its inactive and operative positions, respectively.

I claim:

1. In a photographic camera of the type provided with a flash unit movable with respect to a camera housing between (i) an inactive position in which said flash unit forms an integrated part of said housing to cover a taking lens and (ii) an operative position in which said flash unit is remote from said lens to permit picture-taking, the improvement comprising:

means defining an opening in a front face of said camera housing;

means supporting said lens for translation along an optical axis, through said opening, between a storage position retracted in said camera housing and a picture-taking position extended from said front face; and means for translating said lens to its picture-taking and storage positions in response to movement of said flash unit to its operative and inactive positions, respectively.

2. In a photographic camera of the type provided with a flash unit movable with respect to a camera housing between (i) an inactive position in which said flash unit forms an integrated part of said housing to cover a taking lens and (ii) an operative position in which said flash unit is remote from said lens to permit picture-taking, the improvement comprising:

means defining an opening in a front face of said camera housing;

means supporting said lens for translation along an optical axis, through said opening, between a storage position retracted in said camera housing and a picture-taking position extended from said front face;

means for urging said lens to translate to its picture-taking position; and means supporting said flash unit for pivotal movement over said front face to its inactive position to translate said lens to its storage position and for pivotal movement removed from over said front face to its operative position to permit said urging means to translate said lens to its picture-taking position.

3. In a photographic camera of the type provided with a flash unit movable with respect to a camera housing between (i) an inactive position in which said flash unit forms an integrated part of said housing to cover a taking lens and (ii) an operative position in which said flash unit is remote from said lens to permit picture-taking, the improvement comprising:

means supporting said lens for movement between a storage position retracted in said camera housing and a picture-taking position extended from said housing;

first means for urging said lens to its picture-taking position;

means supporting said flash unit to move said lens to its storage position, against the urging of said first means, as said flash unit is moved to its inactive position;

second means for urging said flash unit to its operative position; and means for securing said flash unit in its inactive position to retain said lens in its storage position, said securing means being releasable to permit said second means to move said flash unit to its operative position to permit said first means to move said lens to its picture-taking position.

* * * * *